US012479122B2

(12) United States Patent
Harwood

(10) Patent No.: US 12,479,122 B2
(45) Date of Patent: Nov. 25, 2025

(54) WOODTURNING GOUGE FOR THE FABRICATION OF BOWLS

(71) Applicant: Ashley Harwood LLC, Charleston, SC (US)

(72) Inventor: Ashley Harwood, Charleston, SC (US)

(73) Assignee: Ashely Harwood LLC, Charleston, SC (US)

(*) Notice: Subject to any disclaimer, the term of this patent is extended or adjusted under 35 U.S.C. 154(b) by 485 days.

(21) Appl. No.: 18/047,227

(22) Filed: Oct. 17, 2022

(65) Prior Publication Data

US 2023/0120004 A1 Apr. 20, 2023

Related U.S. Application Data

(60) Provisional application No. 63/256,816, filed on Oct. 18, 2021.

(51) Int. Cl.
*B27G 15/00* (2006.01)

(52) U.S. Cl.
CPC .................................... *B27G 15/00* (2013.01)

(58) Field of Classification Search
CPC .............. B27G 15/00; B27C 7/02; B27C 7/00
USPC ...................................................... 142/56, 42
See application file for complete search history.

(56) References Cited

U.S. PATENT DOCUMENTS

| | | | | | |
|---|---|---|---|---|---|
| 622,461 | A | * | 4/1899 | Glardon-Jacquet et al. | B27G 15/00 30/167 |
| 1,003,584 | A | * | 9/1911 | Calahan | B27G 15/00 142/56 |
| 4,095,630 | A | | 6/1978 | Kirk et al. | |
| 4,754,787 | A | * | 7/1988 | Smith | B27G 15/00 82/158 |
| 5,682,933 | A | * | 11/1997 | Martel | B27G 15/00 142/56 |
| 6,253,812 | B1 | | 7/2001 | Rinehart | |
| 10,493,651 | B1 | | 12/2019 | Farris et al. | |
| 2010/0203808 | A1 | | 8/2010 | Hout et al. | |
| 2012/0006448 | A1 | * | 1/2012 | Batty | B27G 15/00 76/119 |

FOREIGN PATENT DOCUMENTS

| | | | | | |
|---|---|---|---|---|---|
| CA | 2691463 | C | | 11/2015 | |
| GB | 2266855 | A | * | 11/1993 | B27G 15/00 |
| GB | 2336336 | A | * | 10/1999 | B23Q 11/0046 |

* cited by examiner

*Primary Examiner* — Alan Snyder
(74) *Attorney, Agent, or Firm* — Kubota & Basol LLP

(57) ABSTRACT

The present invention surrounds a gouge for use in woodturning, particularly in the fabrication of wood bowls, wherein the gouge is configured to provide longer reach with decreased deflection. The decreased deflection allows safer and more efficient woodturning process, resulting in better quality woodturning products. The gouge includes an inner cutting profile which is offset upward from the center of the outer profile, thus providing more structural rigidity when extending the tool from a tool rest and into the concavity of a bowl being turned.

13 Claims, 6 Drawing Sheets

SECTION A – A

DETAIL C

WOODTURNING GOUGE FOR THE FABRICATION OF BOWLS

CROSS REFERENCE TO RELATED APPLICATIONS

This application claims the benefit of U.S. Provisional Patent App. No. 63/256,816 entitled "WOODTURNING GOUGE FOR THE FABRICATION OF BOWLS" and filed on Oct. 18, 2021, the entire contents of which is incorporated herein by reference in its entirety for all purposes.

FIELD OF THE INVENTION

The present invention is directed to a gouge for use in woodturning, particularly in the fabrication of wood bowls, wherein the gouge is configured to provide longer reach with decreased deflection so as to provide a safer and more efficient woodturning process, resulting in better quality woodturning products.

BACKGROUND OF THE INVENTION

Woodturning tools surround the use of a sharpened cutting tool which is configured to be held statically in relation to a piece of wood which is rapidly rotated, typically between 50-2500 RPM, about an axis on machinery such as a lathe. The static cutting tool having a sharpened distal end is advanced toward and into the surface of the piece of wood to carve a desired profile or shape into the piece of wood as it turns.

Due to the speed at which the wood piece rotates, a craftsperson (also known as a "woodturner") is able to effectively make identical radius cuts around the axis of rotation. For this reason, woodturning is particularly advantageous when manufacturing items having at least one portion having a circular cross section in relation to an axis of rotation. For example—Finished pieces which are commonly made with woodturning, each typically having a circular cross-section about an axis, include spindle legs for furniture, baseball bats, candlestick holders, and bowls.

Cutting tools which are commonly used by woodturners include, but are not limited to gouges, parting tools, scrapers, and skews. Each of these cutting tools provide a particular function and are available in a variety and shapes and sizes. Woodturning tools are commonly affixed to a handle which is axially aligned with the handle to provide a woodturner a comfortable handle and leverage as cutting edge is advanced into the spinning piece.

A woodturning tool 1000 comprises three main aspects, as shown in FIG. 1A-FIG. 1B—a handle 1010, the elongated body 1050, and a cutting edge 1100. The elongated body of certain woodturning tools comprises a fluted portion 1060 which matches the profile of the cutting edge 1100, and a bar 1070 serving as an extension of the tool. As the tool is used and the cutting edge resharpened, material of the fluted portion is removed during the sharpening process. Once the fluted portion is eliminated through repeated sharpening through grinding, the tool is no longer usable. Although the bar 1070 can be configured for increased stiffness through use of differing geometries, diameter, and materials, existing options in the prior art for providing a stiffer flute 1060 often require increased number of processes surrounding metallurgy and specialized manufacturing.

When using the woodturning tool, the user holds the handle 1000, rests the elongated body 1050 on a tool rest 1200, and advances the cutting edge 1100 toward a spinning piece 1300. The tool rest 1200 provides a repositionable static and stable fulcrum point which the woodturner uses to reach the cutting edge 1100 of the tool toward the spinning piece 1300. In most woodturning processes, the cutting edge 1100 of the woodturning tool is brought into contact with the spinning piece 1300 on an external surface 1310 of the piece. Thus, the tool rest is able to be positioned in near proximity with the spinning piece as shown in FIG. 1A.

When fabricating an internal surface of a bowl, such as shown in FIG. 1B, extending the tool rest 1200 into the concavity 100 of the bowl, particularly when cutting across the bottom of the inside of the bowl, the tool rest 1200 can get in the way and restrict movement of the bowl gouge. In such circumstances it may be desired to place the tool rest 1200 externally from the bowl and the woodturning tool is extended to the distance between the rest 1200 and the internal surface 1410 of the bowl, such as shown in FIG. 1B. The extension of the woodturning tool between the tool rest 1200 and the internal surface 1410 of the bowl creates a moment arm which can result in flexing of the wood turning tool as the cutting edge engages with the surface of the piece.

Flexing of a woodturning tool can result in chatter or vibration resulting from the flexion of the woodturning tool. As the woodturning tool flexes, the cutting edge eventually releases from the surface of the spinning piece. As the cutting edge releases, the woodturning tool springs back, wherein the cutting edge reengages with the surface of the spinning piece. This chatter can result in a number of unwanted outcomes such as unwanted blemishes or patterns—sometimes referred to as "chatter marks"—on the wood surface. In certain scenarios, a tool may catch which is the result of the cutting edge of the tool being rapidly pulled by the spinning piece when the cutting edge is momentarily moving at the same rate as the spinning piece. The catching of the tool's cutting edge may result in the tool handle being kicked upward or pulled from the user's hand. When a tool is extended away from the tool rest, as when fabricating the inner surface of a bowl, the user's leverage for controlling the tool is decreased (unless the length on the user's side is increased) thus increasing the severity of a catch and increasing the chance of a tool being violently pulled from the user's hand. If a tool is pulled from a user's hand, it may result in contacting the user or other bystander. Due to the need to maintain sharp woodturning tools, unintended contact with the cutting edge of the woodturning tool may result in injury due to laceration.

Furthermore, excessive chatter or using excessive force to attempt to eliminate chatter can dislodge a piece of wood from the fixturing mechanisms, dislodging the piece of wood from the lathe, and result in damage to the piece, damage to equipment, injury to the woodturner, and death in extreme cases.

Therefore, there is an identified need to provide a woodturning tool for use in fabricating bowls wherein the woodturning tool mitigates tool flexion and chatter and provides increased leverage for easier control.

SUMMARY OF THE INVENTION

It is an aspect of certain embodiments of the present invention to comprise a woodturning tool configured to fabricate bowls having an increased stiffness to help eliminate chatter and vibration when fabricating bowls.

Traditional fluted woodturning tools, such as those disclosed by U.S. Pat. No. 8,800,613 to Batty ("Batty")—incorporated by reference herein for all purposes—follow a traditional woodturning tool design. Woodturning tools intended for fabricating bowls are commonly referred to as bowl gouges. Traditional and existing bowl gouges are characterized by a bar 1070 on a proximal aspect of the tool, and a fluted distal portion 1060, as shown in FIG. 1B. The distal end of the fluted portion comprises a cutting edge 1100 which is sharpened for cutting or gouging the spinning piece of wood.

A bowl gouge of the prior art, as shown in FIG. 2A-FIG. 2C is characterized by a flute profile 1065 wherein the internal aspect 1500 of the flute has a radius 1510 less than the radius 1610 of the outer aspect 1600 of the flute, and wherein the radius 1510 of the inner aspect 1500 is concentric to the radius 1610 of the outer aspect 1600 of the flute.

Bowl gouges typically comprise one of three internal flute profiles 1065. A U-shaped flute profile 1065 as shown in FIG. 2A, a V-shaped flute profile 1065 as shown in FIG. 2B, or a parabolic/elliptical flute profile 1065 as shown in FIG. 2C. The flute profiles of the prior art as shown in FIG. 2A-FIG. 2C comprise an inner aspect having a radius smaller than the radius of the outer aspect, wherein the radius of the inner aspect is concentric with the radius of the outer aspect of the flute profile.

Fluted tools with an inner aspect having a circular arc profile, such as shown in FIG. 2D, are commonly referred to as spindle gouges. A spindle gouge, ill-configured for bowl turning, typically comprises an inner aspect 1500 having an inner radius 1510 equal to or greater than the radius 1610 of the outer aspect 1600 of the flute profile. Spindle gouges provide a cutting edge for operations such as cutting a spinning piece wherein the wood grain runs parallel to the axis of rotation. The use of a spindle gouge when the wood grain is perpendicular to the axis of rotation would be inefficient at removing material and could increase the chances of the tool catching. Thus, spindle gouges are not recommended for fabricating on the inner concave surface 1410 of a bowl as the wood grain in bowls typically runs perpendicular to the axis of rotation.

When turning the inner surface 1410 of a bowl, a larger portion of the tool's length extends beyond the tool rest and into the bowl. Thus, the user has less leverage to control the action of the tool particularly if the cutting edge catches as cutting into the wood, and there is increased leverage imparted by the portion of the tool which extends beyond the tool rest and into the concavity of the bowl. A tool that catches when fabricating a bowl can result in leaving unwanted marks in the wood surface. In the event a tool catches, the handle 1010 of the tool is often kicked upward. Due to the decreased leverage for the user due to the extension beyond the tool rest 1200 into the concavity 1400 of the bowl, the action of a tool catching can be difficult to control. Furthermore, the longer extension of the tool 1000 beyond the tool rest 1200 results in increased leverage which a tool catching can impart into flexing the tool and inducing chatter. A tool catching can result in the tool being pulled from the user's hand into the rapidly spinning piece, throwing the tool and potentially causing injury to the user or other individuals in near proximity to the tool. Thus, it is an aspect of the present invention to provide a woodturning tool having a fluted portion with increased rigidity to resist flexion and thus mitigates chatter and the tool catching.

Certain existing technologies attempt to address the problem of chatter when woodturning through the use of replaceable carbide cutters wherein the woodturning tool comprises an elongated shaft configured to attachable receive a carbide cutter at a distal cutting end. Solutions, such as those disclosed by U.S. Pat. No. 10,493,651 to Farris, et al. ("Farris")—incorporated by reference herein for all purposes—provide an increased level of rigidity for a longer aspect of the woodturning tool by eliminating the need for a flute. However, although carbide cutters are sharp when first installed, they dull through use and replacement is often time consuming and require additional tools and parts which are easily lost. Furthermore, the use of carbide cutters scrapes the wood versus the cutting action of a traditional gouge. Scraping the wood into shape can tear the fibers of the wood and requires significantly more sanding time to achieve an ideal surface. A traditional gouge provides a bevel which is intended to support and stabilize the wood surface while the wood is being cut. When used properly, gouges provide a much cleaner, more efficient cut and a better surface finish. The use of traditional fluted woodturning tools results in more control, better quality of cut, faster results, more consistency and higher quality end-products versus the use of woodturning tools which use replaceable carbide cutters.

It is an aspect of the present invention to provide a bowl gouge wherein the flute profile comprises an inner aspect which is eccentrically located in relation to the outer aspect. In certain embodiments the radius of the inner aspect is offset vertically upward from the center of the outer aspect, thereby providing increased stiffness. The increased stiffness of certain embodiments allows for a woodturning tool which is 25% longer than found in the prior art with no increase of chatter.

It is an aspect of the present invention to provide a woodturning tool for the fabrication of the inner aspect of a bowl having increased rigidity. The benefits of increased rigidity include allowing the use of a longer tool length, thus allowing for increased reach and capacity when fabricating the inner surface of a bowl. A further benefit of a tool with increased rigidity includes reduced chatter. Reducing chatter serves to reduce unwanted chatter marks on a piece, thus enabling a higher quality end product when fabricating bowls through wood turning, and allows for a deeper bowl without sacrificing quality. A more rigid tool will flex less, thus decreasing the chances of catches as well as reduce the severity of catches when they occur. Thus, a tool with increased rigidity provides increased leverage, a better quality cut surface without defects, decreased chance of catching, and decreased severity of catches thereby enabling the production of deeper bowls with a higher quality end product.

It is an aspect of the present invention to provide a longer tool length through increased rigidity such that a tool rest can be positioned outside the concavity of a bowl, and allow a user to safely and effectively fabricate a deeper concavity of a bowl though woodturning with decreased chatter and decreased chance of catching than with previously existing technologies.

Furthermore, as the shaping of a bowl gouge requires removal of material through grinding, the increased tool rigidity allows for a longer tool, therefore resulting in a longer useable portion, and a longer useful lifespan of the tool.

Further still, it will be appreciated that chatter as discussed herein results in the cutting edge of a tool rapidly engaging, flexing, disengaging, and reengaging with a rapidly moving surface. The rapid reengaging of the cutting edge with a rapidly moving surface occurs as an impact, which over time will dull a cutting edge. Thus, it is an aspect of the present invention to prolong the life of the cutting edge of a tool through the reduction of chatter through increased rigidity. Through the prolonged life of the cutting edge requires less sharpening, thus allowing for longer periods of fabrication between sharpening, and thus prolonging the overall lifespan of a tool.

These and other advantages will be apparent from the disclosure of the inventions contained herein. The above-described embodiments, objectives, and configurations are neither complete nor exhaustive. Other embodiments of the invention are possible using, alone or in combination, one or more of the features set forth above or described in detail below. Further, this Summary is neither intended nor should it be construed as being representative of the full extent and scope of the present invention. The present invention is set forth in various levels of detail in this Summary, as well as in the attached drawings and the detailed description below, and no limitation as to the scope of the present invention is intended to either the inclusion or non-inclusion of elements, components, etc. in this Summary. Additional aspects of the present invention will become more readily apparent from the detailed description, particularly when taken together with the drawings, and the claims provided herein.

DETAILED DESCRIPTION OF VARIOUS EMBODIMENTS

Figure 1A:
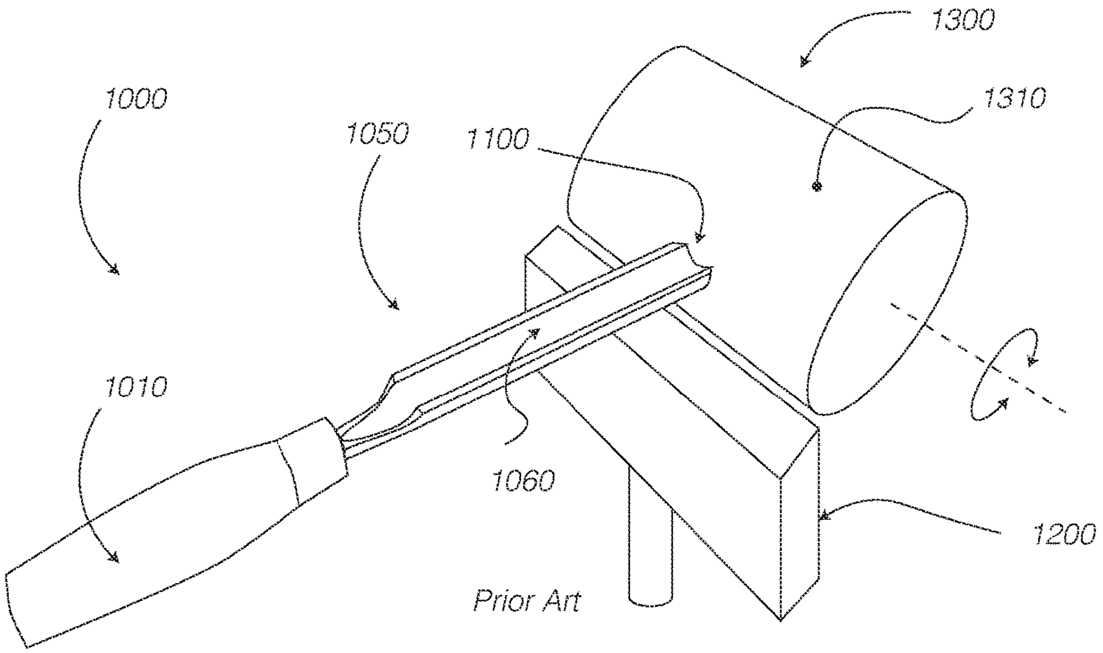
FIG. 1A—A perspective view of woodturning on an external surface of a woodturning piece in the prior art FIG. 1B—A perspective view of woodturning on an external surface of a woodturning piece in the prior art FIG. 2A—A cross-sectional view of a fluted portion of a bowl gouge of the prior art FIG. 2B—A cross-sectional view of a fluted portion of a bowl gouge of the prior art FIG. 2C—A cross-sectional view of a fluted portion of a bowl gouge of the prior art FIG. 2D—A cross-sectional view of a fluted portion of a spindle gouge of the prior art FIG. 3—A perspective view of certain embodiments of a bowl gouge of the present invention FIG. 4A—A side view of certain embodiments of a of certain embodiments of a bowl gouge of the present invention FIG. 4B—A cross-sectional view of the bowl gouge of FIG. 4A FIG. 4C—A distal end view of certain embodiments of a of certain embodiments of a bowl gouge of the present invention FIG. 4D—A cross-sectional view of the bowl gouge of FIG. 4C FIG. 4E—A detailed view of the cross-sectional view as shown in FIG. 4B
Figure 1B:
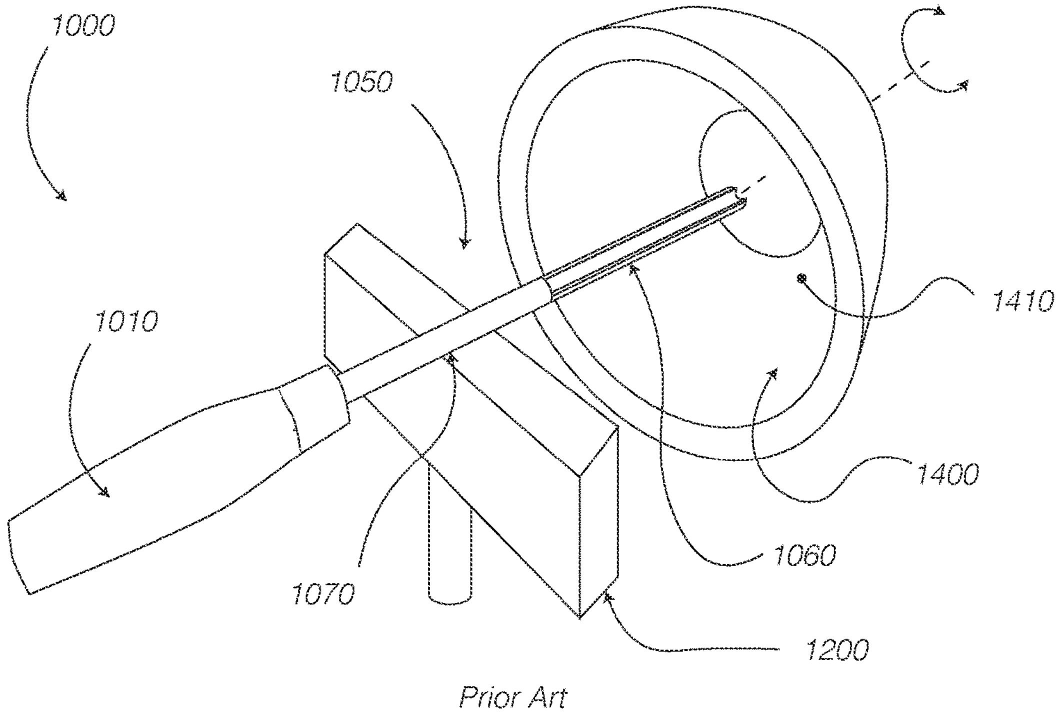
Figure 2A:
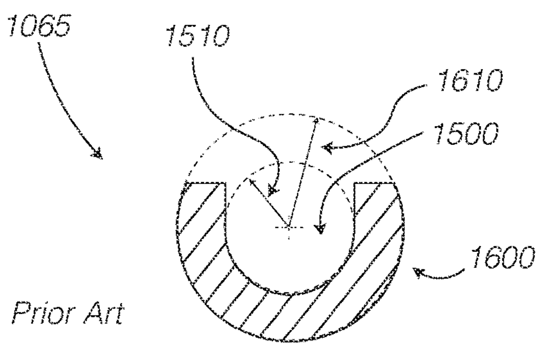
Figure 2B:
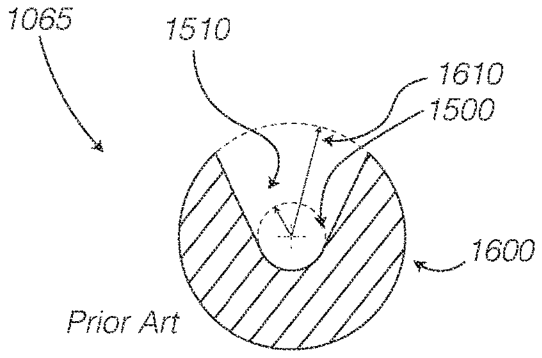
Figure 2C:
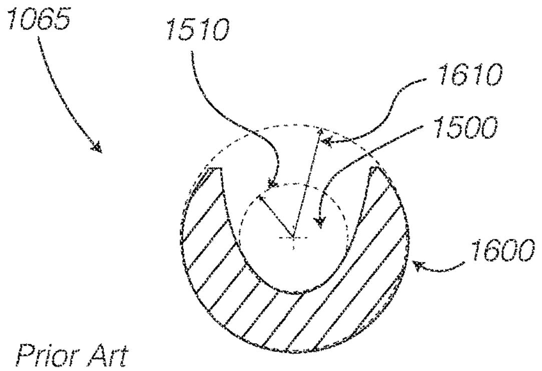
Figure 2D:
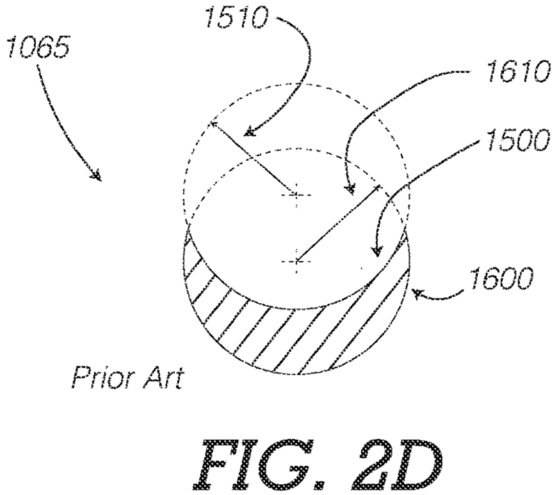
Figure 3:
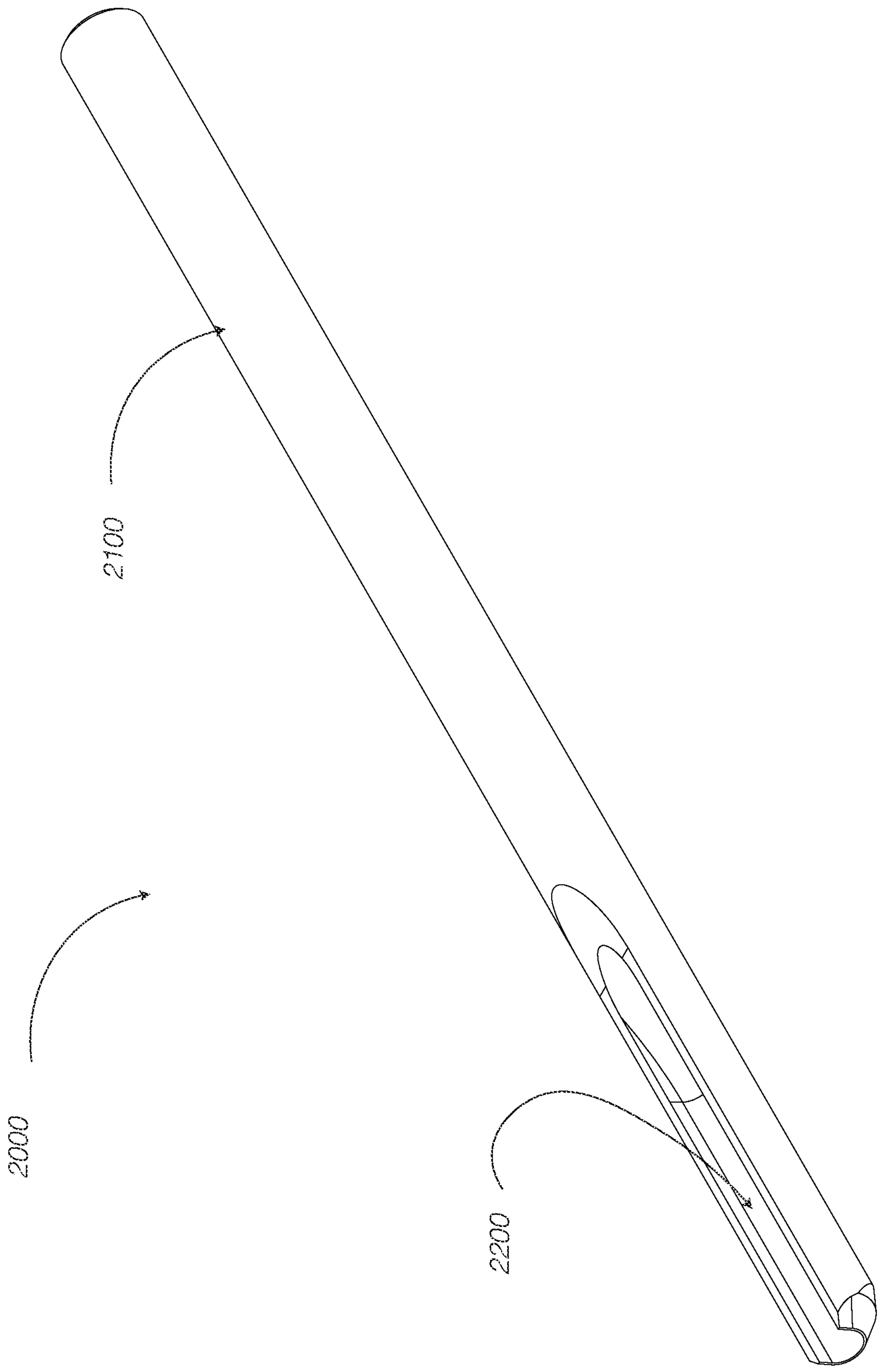
Figure 4B:
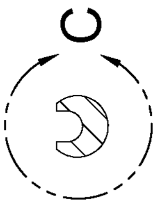
Figure 4A:
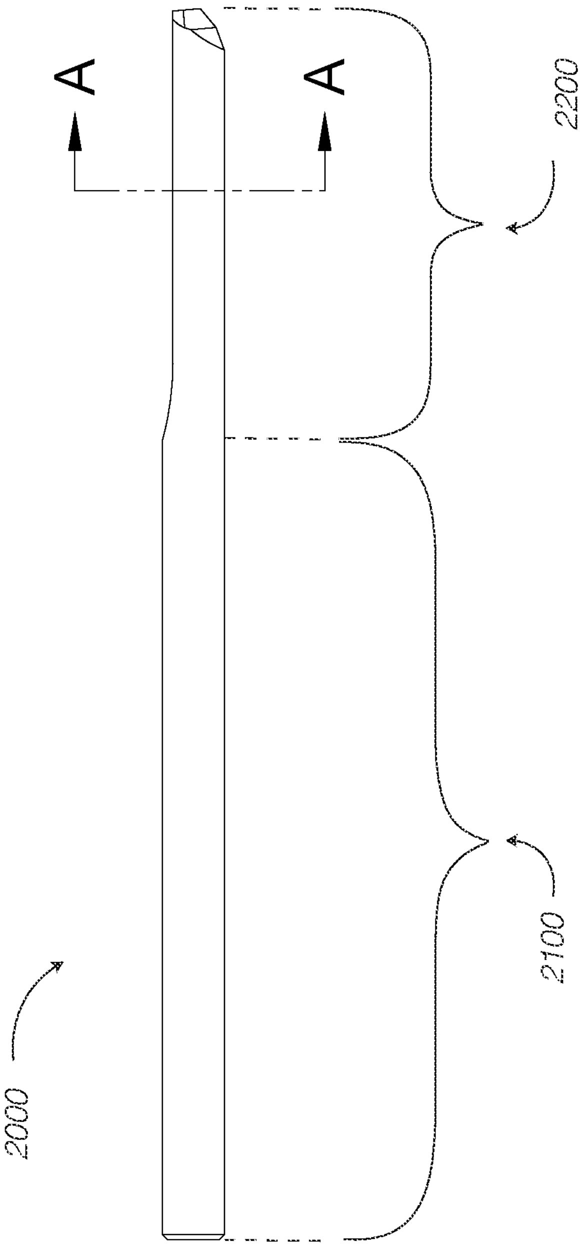
Figures 4C, 4D:
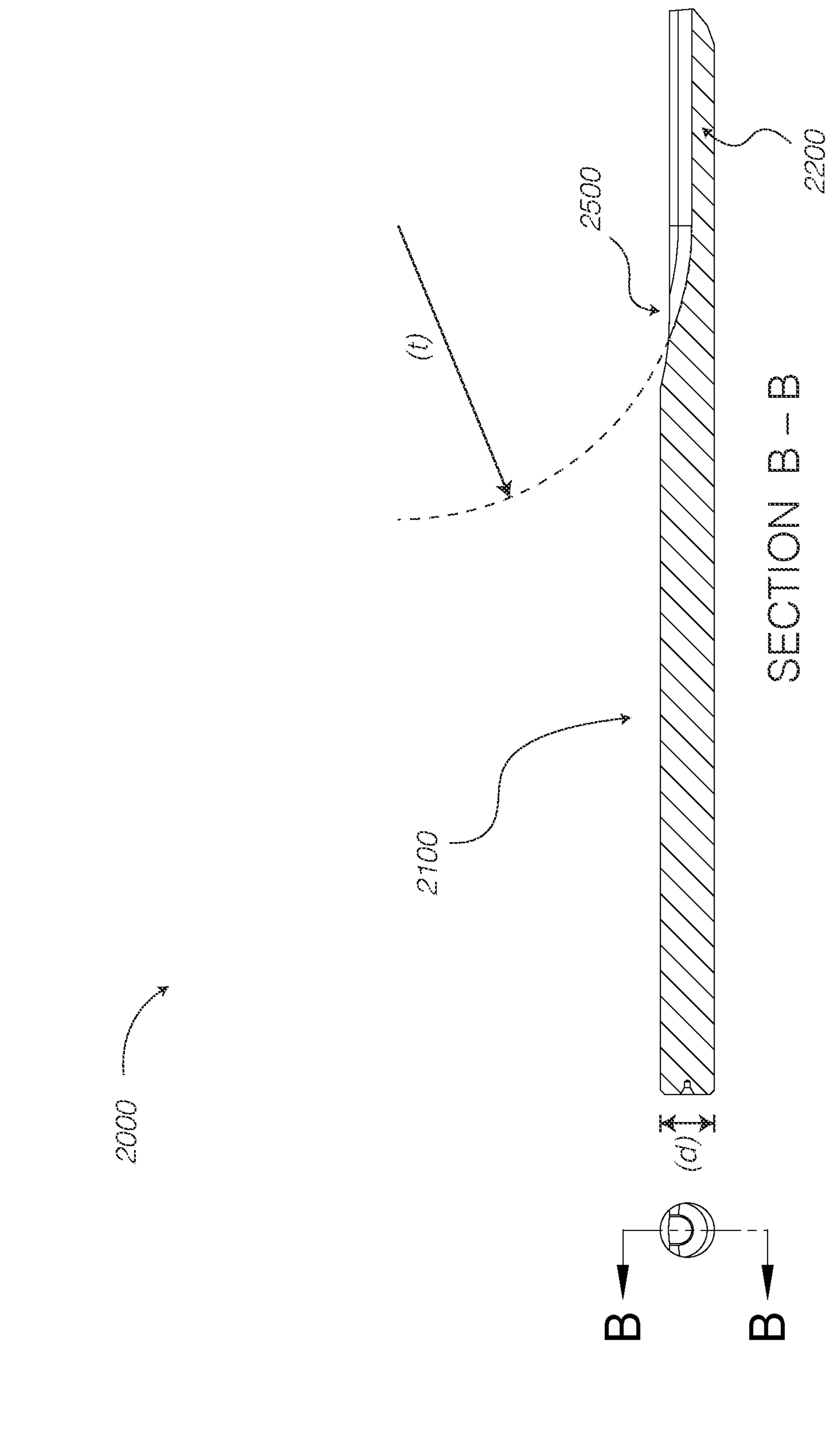
Figure 4E:
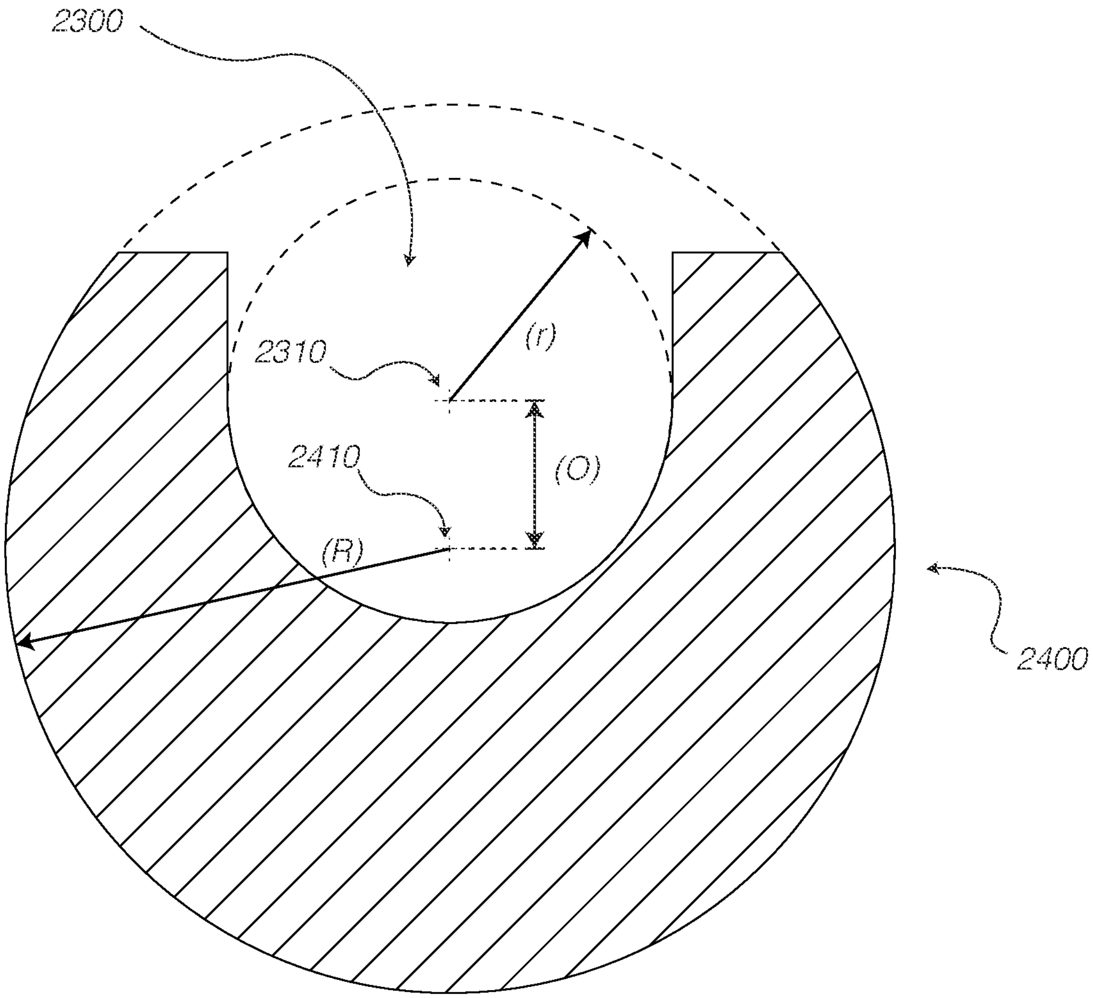

Certain embodiments of the present invention, shown in FIG. 3 comprise a bowl gouge 2000 a bar portion 2100 configured to interconnect with a handle, and a distally located fluted portion 2200. In certain embodiments the bar portion 2100 comprises a round profile. As shown in FIG. 4A-FIG. 4E, the fluted portion 2200 comprises an inner aspect 2300 comprising a radius (r), and an outer aspect 2400 comprising a radius (R) which is larger than the radius (r) of the inner aspect. The radius (r) of the inner aspect is eccentrically offset (O) from the radius (R) of the outer aspect. In certain embodiments, as shown in FIG. 4E, the center 2310 of the inner aspect of the fluted portion is offset vertically upward from the center 2410 of the outer aspect by a distance (O).

Although embodiments shown comprise an inner aspect 2300 wherein the profile of the inner aspect and outer aspect comprise a circular arc, alternate shapes not shown herein are within the spirit and scope the present invention. Although embodiments shown comprise an outer aspect 2400 having a profile of a circular arc are shown, embodiments within the spirit and scope of the present invention are not limited thereto. Embodiments comprising an outer aspect 2400 having an elliptical, parabolic, V-shaped, U-shaped, square, hexagonal, octagonal, or other geometrically shaped outer aspect 2400 profile are within the spirit and scope of the present invention. Embodiments comprising an inner aspect 2300 having an elliptical, parabolic, V-shaped, or U-shaped, inner aspect 2300 profile are within the spirit and scope of the present invention.

In certain embodiments, as shown in FIG. 4E, the inner aspect comprises a radius (r), and the outer aspect comprises a radius (R), wherein: (R≥2*r). The use of a smaller inner radius (r) in relation to (R) results in a cutting edge 1100 results in a smaller cutting edge, which results in a tool which is less prone to catching. However, embodiments where the inner aspect comprises a radius (r), and the outer aspect comprises a radius (R), wherein: (R≤2*r), are within the spirit and scope of the present invention.
The inner aspect of certain embodiments comprises an offset (O) wherein: (2*O≥r). In certain embodiments the inner aspect comprises an offset (O) wherein: $(O=\square^{2}/_{3\square}*r)$. In certain embodiments the inner aspect comprises an offset (O) wherein: $(O\geq\square^{2}/_{3\square}*r)$.

In efforts to maintain rigidity while maximizing a usable fluted portion of the tool, the transition from the fluted portion 2200 to the bar 2100 is minimized. In certain embodiments the bar diameter of the tool is represented as (d). In certain embodiments, the transition between the fluted portion 2200 and the bar 2100 occurs within a transition radius (t) wherein: (t≤5d).

While various embodiments of the present invention have been described in detail, it is apparent that modifications and alterations of those embodiments will occur to those skilled in the art. However, it is to be expressly understood that such modifications and alterations are within the scope and spirit of the present invention. Further, the inventions described herein are capable of other embodiments and of being practiced or of being carried out in various ways. In addition, it is to be understood that the phraseology and terminology used herein is for the purposes of description and should not be regarded as limiting. The use of "including," "comprising," or "adding" and variations thereof herein are meant to encompass the items listed thereafter and equivalents thereof, as well as, additional items.

What is claimed is:

1. A bowl gouge for woodturning comprising:

a distally located fluted portion;

the fluted portion further comprising an inner aspect having a curvilinear profile with a radius (r) and a center;

the fluted portion further comprising an outer aspect having a curvilinear profile with a radius (R) and a center, wherein (R>r); and the center of the inner aspect of the fluted portion offset vertically upward from the center of the outer aspect of the fluted portion by a distance (O), wherein $(O\geq\frac{2}{3}*r)$, and wherein the profile of the inner aspect is entirely within the profile of the outer aspect.

2. The bowl gouge of claim 1, wherein (O<r).

3. The bowl gouge of claim 1, wherein (R≥2*r).

4. The bowl gouge of claim 3, wherein ($O = \frac{2}{3} * r$).

5. The bowl gouge of claim 1, wherein the bowl gouge further comprises a bar configured to interconnect with a handle.

6. The bowl gouge of claim 5, wherein a transition from the fluted portion to the bar portion comprises a radius (t).

7. The bowl gouge of claim 6, wherein the bar comprises a diameter (d) and wherein ($t \leq 5d$).

8. The bowl gouge of claim 7, wherein the inner aspect of the fluted portion comprises a U-shaped profile.

9. The bowl gouge of claim 8, wherein the outer aspect of the fluted portion comprises a round profile.

10. The bowl gouge of claim 8, wherein the outer aspect of the fluted portion comprises an elliptical profile.

11. The bowl gouge of claim 7, wherein the inner aspect comprises an elliptical profile.

12. The bowl gouge of claim 7, wherein the inner aspect comprises a parabolic profile.

13. The bowl gouge of claim 7, wherein the inner aspect comprises a V-shaped profile.

* * * * *